United States Patent
Chang et al.

(10) Patent No.: US 8,711,284 B2
(45) Date of Patent: Apr. 29, 2014

(54) LCD TELEVISION SET CAPABLE OF EXTERNAL CONNECTION WITH APPLICATION PROCESSOR

(76) Inventors: Sheng-Chuang Chang, Taipei (TW); Pao-Tse Wu, Taipei (TW)

( * ) Notice: Subject to any disclaimer, the term of this patent is extended or adjusted under 35 U.S.C. 154(b) by 0 days.

(21) Appl. No.: 13/569,575

(22) Filed: Aug. 8, 2012

(65) Prior Publication Data

US 2013/0107119 A1    May 2, 2013

(30) Foreign Application Priority Data

Oct. 26, 2011   (TW) .............................. 100138761 A (51) Int. Cl.
*H04N 7/00*    (2011.01)
*H04N 11/00*   (2006.01)
*H04N 5/66*    (2006.01)
*H04N 9/12*    (2006.01)
*H04M 3/00*    (2006.01)
*H04N 7/10*    (2006.01)
*H04N 7/025*   (2006.01)
*H04N 7/173*   (2011.01)

(52) U.S. Cl.
USPC ............. 348/552; 348/739; 455/420; 725/34; 725/115

(58) Field of Classification Search
None
See application file for complete search history.

(56) References Cited

U.S. PATENT DOCUMENTS

| | | | |
|---|---|---|---|
| 2003/0046689 A1* | 3/2003 | Gaos | 725/34 |
| 2011/0157480 A1* | 6/2011 | Curl | 348/739 |
| 2011/0247044 A1* | 10/2011 | Jacoby | 725/115 |
| 2013/0109371 A1* | 5/2013 | Brogan et al. | 455/420 |

* cited by examiner

*Primary Examiner* — Jefferey Harold
*Assistant Examiner* — Sean Haiem
(74) *Attorney, Agent, or Firm* — Ming Chow; Sinorica, LLC (57) ABSTRACT

A LCD television set includes a remote controller, a flat screen television processor, a docking base, and a first connector. The remote controller includes a first key group for operating the television set and a second key group for operating a smartphone. The flat screen television processor processes a television video signal, displays a frame on a display, and processes remote control signals corresponding to the first and second key groups. The docking base docks the smartphone and has the first connector in contact with a second connector disposed at the smartphone, such that an application processor of the smartphone and the flat screen television processor are electrically connected. The flat screen television processor outputs signals via the first and second connectors based on the remote control signals, thereby triggering the application processor to execute applications.

11 Claims, 6 Drawing Sheets

LCD TELEVISION SET CAPABLE OF EXTERNAL CONNECTION WITH APPLICATION PROCESSOR

The current application claims a foreign priority to the patent application of Taiwan No. 100138761 filed on Oct. 26, 2011.

FIELD OF THE INVENTION

The present invention relates to LCD television sets, and more particularly, to a LCD television set having an ability to incorporate with an application processor of a smartphone, such that a remote controller applied directly to the LCD television set can operate the smartphone.

BACKGROUND OF THE INVENTION

A conventional smart television set is always standalone. Hardware circuits and software inside the conventional smart television set can independently perform the functions of the conventional LCD television set, and can independently perform the functions equivalent to computer programs execution. The conventional smart television set works in a way similar to integrating the conventional LCD television set and a conventional computer into an electronic machine.

Conventional smartphones not only have conventional mobile phone functions but also have handheld computer functions. The conventional smartphones are each equipped with a connector for external connection with a plurality of devices, including, for example, a USB flash drive, a keyboard, or a liquid crystal display.

The inventor of the present invention understands that the functions of a conventional smart television set and the functions of a conventional smartphone cannot be integrated with each other because of a lack of a design for integration of a hardware silicon intellectual property (IP) chip. Therefore, the inventor is eager to devise an invention and make improvements. Hence, the inventor puts forth a LCD television set capable of external connection with an application processor.

SUMMARY OF THE INVENTION

The objective of the present invention is to provide a LCD television set having an ability to incorporate with an application processor of a smartphone, such that a remote controller applied directly to the LCD television set can operate the smartphone.

In order to achieve the above objective, the present invention provides a LCD television set, comprising: a remote controller comprising a first key group having a plurality of keys and a second key group having a plurality of keys, wherein the first key group is for use in operating the LCD television set, and the second key group is for use in operating a smartphone; a flat screen television processor for processing an incoming television video signal, displaying a frame corresponding to the television video signal on a display, and processing a plurality of remote control signals corresponding to the first and second key groups; a docking base being for docking a smartphone and equipped with a first connector; and the first connector electrically connected to the flat screen television processor and in contact with a second connector disposed at the smartphone, such that the flat screen television processor and an application processor of the smartphone are electrically connected, wherein the flat screen television processor outputs a plurality of signals via the first and second connectors based on the remote control signals of the second key group, and a portion of the signals trigger the application processor of the smartphone to execute a plurality of applications corresponding thereto.

The present invention further provides a LCD television set, comprising: a remote controller comprising a first key group having a plurality of keys and a second key group having a plurality of keys, wherein the first key group is for use in operating the LCD television set, and the second key group is for use in operating a smartphone; a flat screen television processor for processing an incoming television video signal, displaying a frame corresponding to the television video signal on a display, and processing a plurality of remote control signals corresponding to the first and second key groups; a docking base being for docking a smartphone and equipped with an interface connector for use with a bus interface; and the bus interface for use with the application processor electrically connected to the flat screen television processor and the smartphone, wherein the flat screen television processor outputs a plurality of signals via the bus interface based on the remote control signals of the second key group, and a portion of the signals trigger the application processor of the smartphone to execute a plurality of applications corresponding thereto.

BRIEF DESCRIPTION OF THE DRAWINGS

To enable persons skilled in the art to gain insight into the present invention, technical features and advantages of the present invention are hereunder illustrated with preferred embodiments in conjunction with the accompanying drawings, in which.

DETAILED DESCRIPTION OF THE INVENTION

Figure 1:
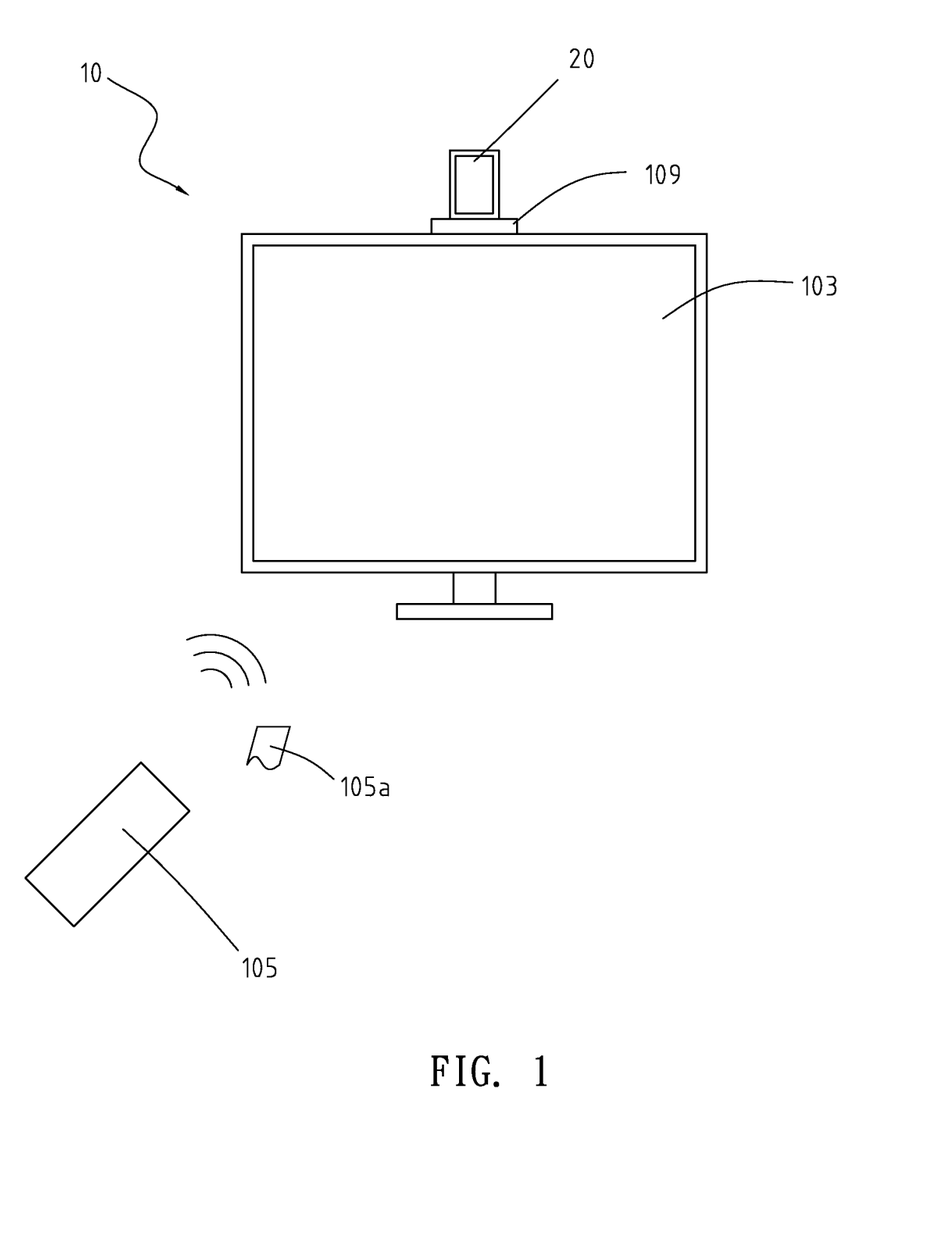
FIG. 1 is a schematic view of the LCD television set connected to a smartphone according to the present invention.
Figure 2:
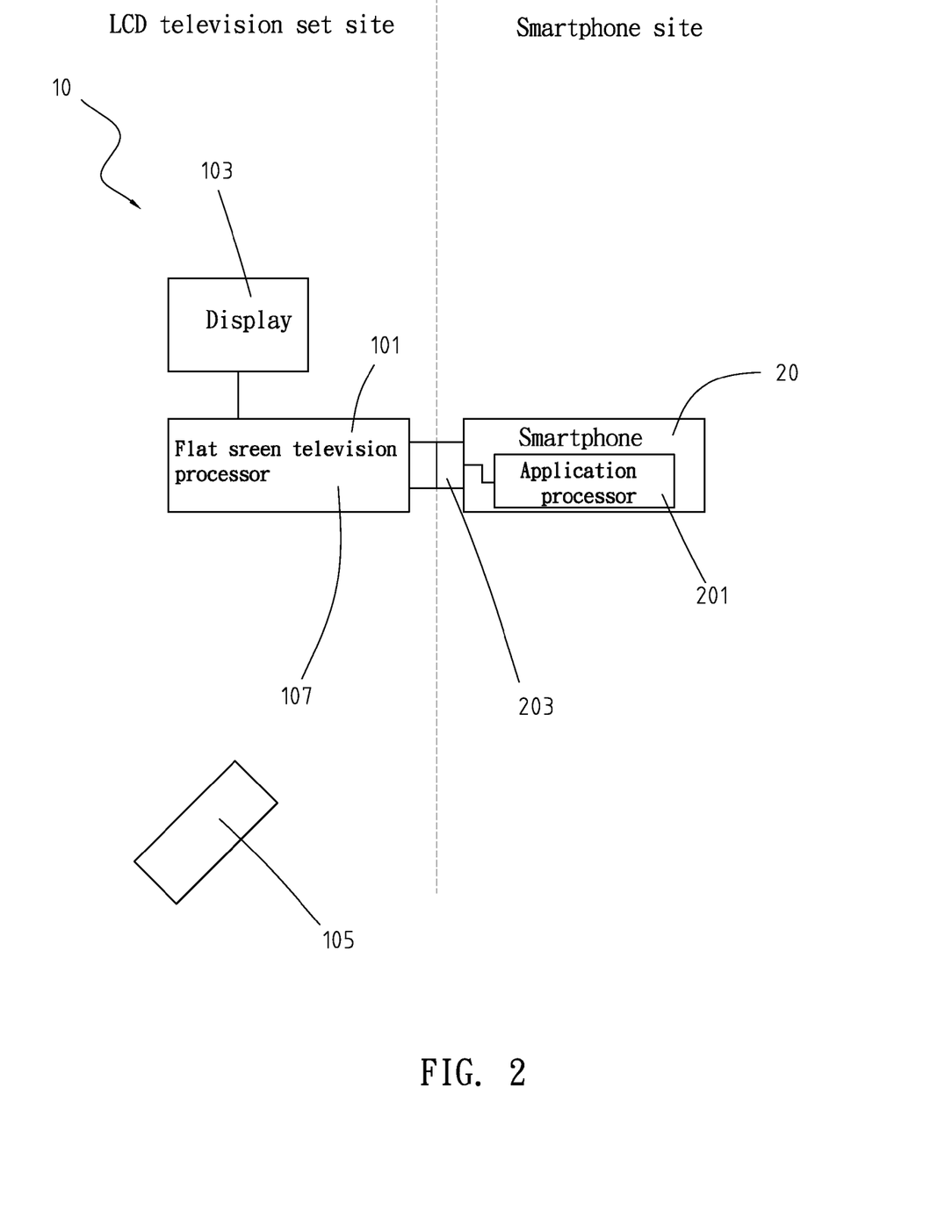
FIG. 2 is a block diagram of the LCD television set according to the first specific embodiment of the present invention.
Figure 3:
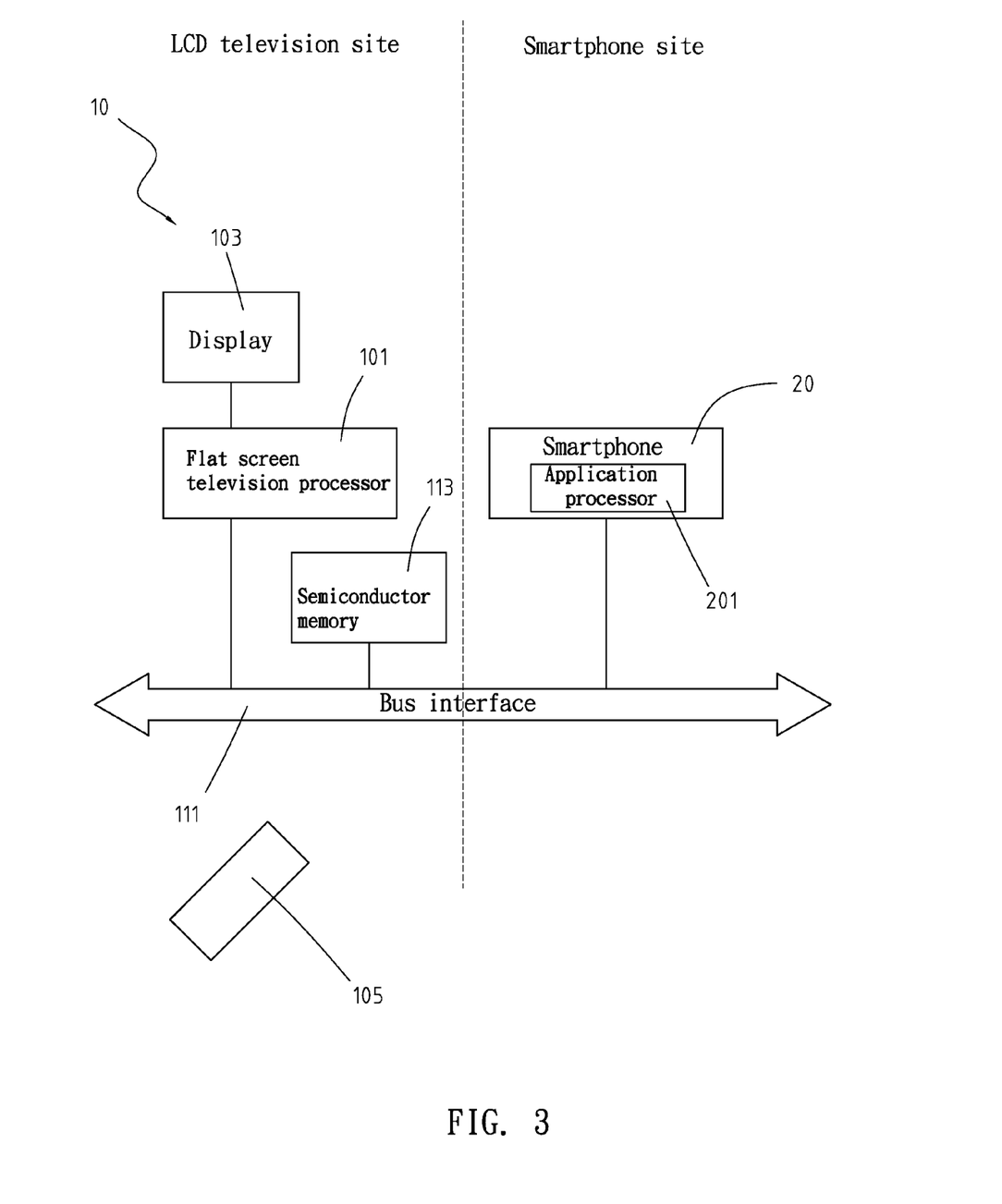
FIG. 3 is a block diagram of the LCD television set according to the second specific embodiment of the present invention.

Referring to FIGS. 1, 2 and 3, according to the present invention, a LCD (Liquid Crystal Display) television set 10 and a smartphone 20 can be connected together, so as to enable signal transmission between a flat screen television processor 101 of the LCD television set 10 and an application processor 201 of the smartphone 20. That is to say, the LCD television set 10 of the present invention is primarily characterized in that the LCD television set 10 is capable of external connection with an application processor, wherein a hardware silicon intellectual property (IP) chip of the flat screen television processor 101 can be integrated with another hardware silicon intellectual property (IP) chip of the application processor 201 of the smartphone 20. From a user's perspective, the user uses a remote controller 105 to exercise remote control over the LCD television set 10 or exercise remote control over the smartphone 20.

Referring to FIG. 2, there is shown a first specific embodiment of the present invention. The LCD television set 10 comprises the flat screen television processor 101, the remote controller 105, a first connector 107, and a docking base 109, as described below. Referring to FIG. 2, the diagram only shows the present invention-related hardware components of the LCD television set 10 and that of the smartphone 20, but omits the remaining unrelated components of the LCD television set 10 and the smartphone 20.

The flat screen television processor 101 processes incoming television video signals (such as broadcast digital television signals) and outputs and displays a frame corresponding to the television video signal on a display 103. Another purpose of the flat screen television processor 101 is to process a plurality of remote control signals 105a emitted from the remote controller 105. The flat screen television processor 101 can be a conventional one, such as a conventional integrated system-on-chip flat screen television processor.

Figure 4:
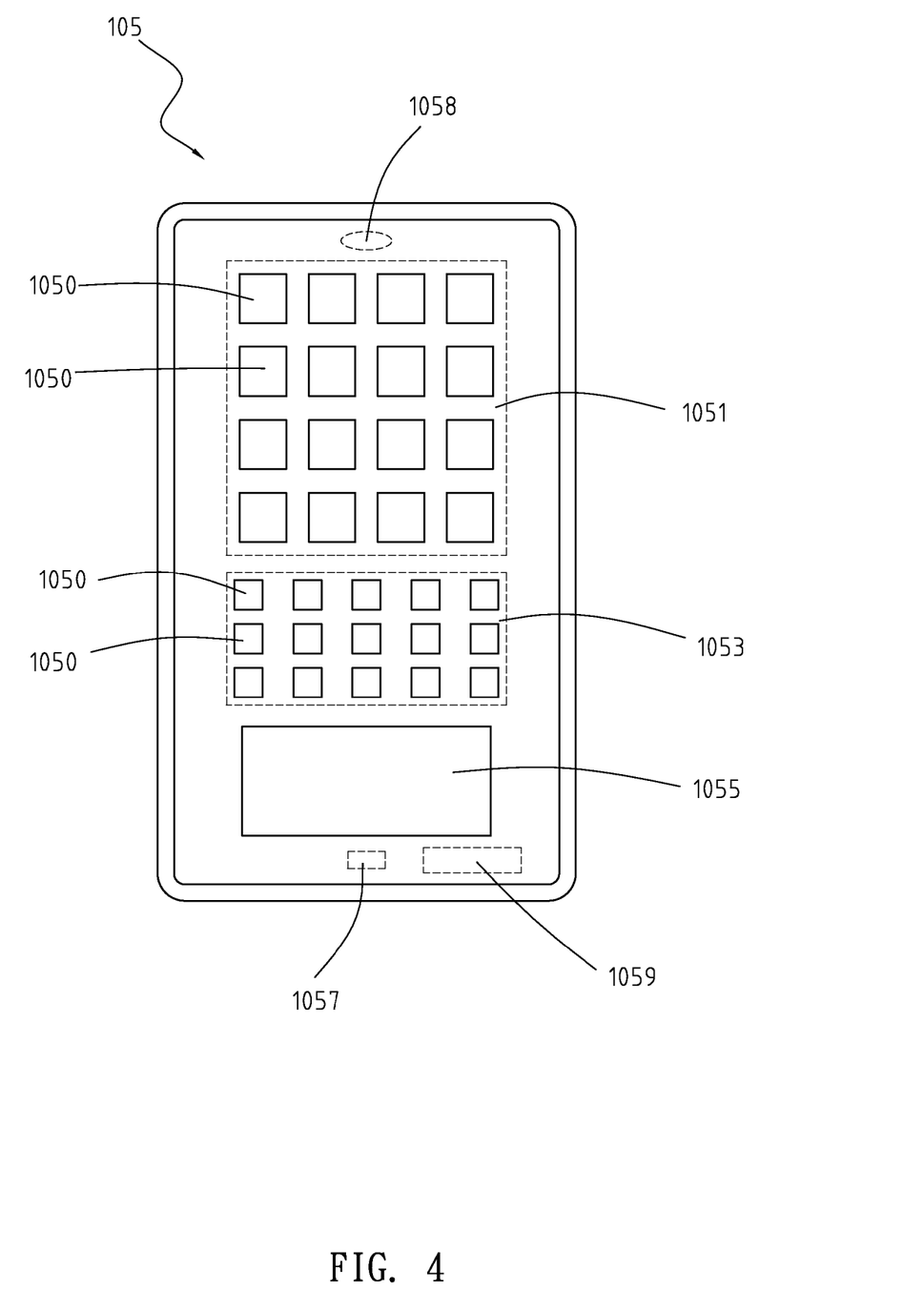
FIG. 4 is a schematic view of a remote controller for use with the LCD television set according to the present invention.

Referring to FIG. 4, once the flat screen television processor 101 receives from the remote controller 105 the remote control signals 105a attributed to a key 1050 of a first key group 1051, for example, the remote control signals 105a for volume adjustment, or the remote control signals 105a for channel selection, the flat screen television processor 101 will send a corresponding signal to a corresponding hardware component (not shown) inside the LCD television set 10, such that the corresponding hardware component can perform a process and thereby respond to the remote control signals 105a of the first key group 1051.

Once the flat screen television processor 101 receives from the remote controller 105 the remote control signals 105a attributed to a key 1050 of a second key group 1053, for example, the remote control signals 105a of an application store (App Store), the remote control signals 105a of Facebook®, the remote control signals 105a of YouTube®, the remote control signals 105a of a browser, the remote control signals 105a for making a phone call with a mobile phone, the remote control signals 105a of Apple® itunes®, or the remote control signals 105a of a game, the flat screen television processor 101 will send a message signal to the application processor 201 via the first connector 107, such that the application processor 201 can execute a corresponding application (App) and thereby respond to the remote control signals 105a of the second key group 1053.

The docking base 109 is use for docking the smartphone 20. The docking base 109 is equipped with the first connector 107. The first connector 107 is electrically connected to the flat screen television processor 101. Electrical contacts (not shown) of the first connector 107 come into contact with electrical contacts (not shown) of a second connector 203 of the smartphone 20, respectively, as soon as the smartphone 20 is positioned on the docking base 109. In doing so, the LCD television set 10 and the application processor 201 are electrically connected. Therefore, the flat screen television processor 101 and the application processor 201 can send signals to each other and receive signals from each other. The docking base 109 can be integrally formed with a casing of the LCD television set 10 as a unitary structure. Alternatively, the docking base 109 can be separated from the casing of the LCD television set 10, wherein a cable (not shown) connects the first connector 107 of the docking base 109 and the flat screen television processor 101.

The superficial structure of the first connector 107 comprises a foolproof mechanism, and preferably further comprises a mechanism that is easy to plug and unplug. The second connector 203 is manufactured in a manner to conform with the design of the first connector 107. The first connector 107 and the second connector 203 are a conventional male connector and a conventional female connector, respectively. For example, a signal transmitted between the first connector 107 and the second connector 203 is a conventional I2C signal or one applicable to high-speed serial communication related prior art. For example, a signal transmitted between the first connector 107 and the second connector 203 serves as a carrier for command information, data information, or staus information.

Furthermore, the application processor 201 of the smartphone 20 sends a signal to the flat screen television processor 101 via the second connector 203. Once the flat screen television processor 101 receives the signal, such as a signal indicating that the smartphone 20 has just received an instant message, or a signal prompting the user to answer an incoming phone call with the smartphone 20, the flat screen television processor 101 will process the received signal and then display a text message corresponding to the signal on the display 103 by means of a conventional screen display (OSD-On Screen Display).

Referring to FIG. 3, there is shown a second specific embodiment of the present invention. The LCD television set 10 comprises the flat screen television processor 101, the remote controller 105, a bus interface 111, and the docking base 109, as described below. Referring to FIG. 3, the diagram only shows the present invention-related hardware components of the LCD television set 10 and the smartphone 20, but omits the remaining unrelated components of the LCD television set 10 and the smartphone 20.

The flat screen television processor 101 processes incoming television video signals (such as broadcast digital television signals) and outputs and displays a frame corresponding to the television video signal on the display 103. Another purpose of the flat screen television processor 101 is to process the plurality of remote control signals 105a emitted from the remote controller 105. The flat screen television processor 101 can be a conventional one, such as a conventional integrated system-on-chip flat screen television processor.

Referring to FIG. 4, once the flat screen television processor 101 receives from the remote controller 105 the remote control signals 105a attributed to a key 1050 of the first key group 1051, for example, the remote control signals 105a for volume adjustment, or the remote control signals 105a for channel selection, the flat screen television processor 101 will send a corresponding signal to a corresponding hardware component (not shown) inside the LCD television set 10, such that the corresponding hardware component can perform a process and thereby respond to the remote control signals 105a of the first key group 1051.

Once the flat screen television processor 101 receives and processes the remote control signals 105a attributed to a key 1050 of the second key group 1053 from the remote controller 105, for example, the remote control signals 105a of an application store (App Store), the remote control signals 105a of Facebook®, the remote control signals 105a of YouTube®, the remote control signals 105a of a browser, the remote control signals 105a for making a phone call with a mobile phone, the remote control signals 105a of Apple® itunes®, or the remote control signals 105a of a game, the flat screen television processor 101 will send a corresponding message signal to the application processor 201 via the bus interface 111, such that the application processor 201 can execute a corresponding application (App) and thereby respond to the remote control signals 105a of the second key group 1053.

The bus interface 111 transmits data bus signals, address bus signals, and control bus signals. Alternatively, the bus interface 111 transmits command information, data information, and state information. The bus interface 111 applies high-speed serial communication bus-related prior art.

The LCD television set 10 is equipped with a semiconductor memory 113 connected to the bus interface 111. The flat screen television processor 101 and the application processor 201 read data from and write data to the semiconductor memory 113. The flat screen television processor 101 writes the contents of a corresponding message (for example, a corresponding message pertaining to execution of an application store, execution of a Facebook® application (App), execution of a YouTube® application (App), execution of a browser application (App), execution of an application (App) for making a phone call with a mobile phone, execution of an Apple® itunes® application (App), or execution of a game application (App)) to the semiconductor memory 113 via the bus interface 111. Afterward, the flat screen television processor 101 sends an interrupt signal to the application processor 201 via the bus interface 111. Then, the application processor 201 reads data from the semiconductor memory 113 through the bus interface 111, so as to respond to the contents of the corresponding message. For example, the application processor 201 executes an application store, executes a Facebook® application (App), executes a YouTube® application (App), executes a browser application (App), executes an application (App) for making a phone call with a mobile phone, executes an Apple® itunes® application (App), or executes a game application (App).

The application processor 201 of the smartphone 20 sends a signal to the flat screen television processor 101 via the bus interface 111. For example, in a situation where the smartphone 20 has just received an instant message or answered an incoming phone call, the application processor 201 writes the contents of the message (for example, "please read a new instant message," or "please answer a call") to the semiconductor memory 113, and then the application processor 201 sends an interrupt signal to the flat screen television processor 101 through the bus interface 111. Afterward, the flat screen television processor 101 reads data from the semiconductor memory 113 via the bus interface 111. Eventually, the flat screen television processor 101 displays the contents of the message (for example, "please read a new instant message," or "please answer a call") on the display 103 by means of a conventional screen display (OSD-On Screen Display).

Take a 3D frame display as an example, assuming that the LCD television set 10 has 3D frame processing and displaying capability, whereas the smartphone 20 stores 3D frame data about a marketing brief, for example. To present the brief, the user inserts the smartphone 20 into the docking base 109 and uses the remote controller 105 to control the smartphone 20 to execute a brief application (App) in a manner that the brief application (App) writes the 3D frame data of the marketing brief to the semiconductor memory 113 sheet by sheet, and then the flat screen television processor 101 reads the 3D frame data of the marketing brief from the semiconductor memory 113 sheet by sheet via the bus interface 111, processes the 3D frame data thus read, and displays the corresponding 3D frames on the display 103 one by one. In the aforesaid example of the 3D frame display, although the smartphone 20 lacks 3D frame processing and displaying capability, the smartphone 20 can gain access to hardware resources of the LCD television set 10, because the LCD television set 10 of the present invention is designed to be capable of integration of hardware silicon intellectual property (IP).

The docking base 109 is use for docking the smartphone 20. The docking base 109 is equipped with an interface connector (not shown). Electrical contacts (not shown) of the interface connector come into contact with electrical contacts (not shown) of a connector (not shown) of the smartphone 20, respectively, as soon as the smartphone 20 is positioned on the docking base 109. In doing so, the LCD television set 10 and the application processor 201 are electrically connected. Therefore, the flat screen television processor 101 and the application processor 201 send signals to each other and receive signals from each other. The docking base 109 can be integrally formed with a casing of the LCD television set 10 as a unitary structure. Alternatively, the docking base 109 can be separated from the casing of the LCD television set 10, wherein a cable (not shown) connects the interface connector of the docking base 109 and the flat screen television processor 101.

Referring to FIG. 4, the remote controller 105 is for use with the LCD television set 10 in the first and second specific embodiments. The remote controller 105 essentially comprises a first key group 1051 and a second key group 1053. The remote controller 105 further comprises a cursor coordinate input device 1055, a microphone 1057, a speaker 1058, and a wireless voice receiving and transmitting circuit 1059. The constituent components of the remote controller 105 are described below.

The first key group 1051 comprises a plurality of keys 1050. Once a key 1050 of the first key group 1051 is pressed, the remote controller 105 will emit the remote control signals 105a corresponding to the key 1050. The key 1050 of the first key group 1051 is adapted to operate the LCD television set 10. The result of the operation of the LCD television set 10 is displayed on a frame 103a shown in FIG. 5. The frame 103a is a television video signal-related frame.

The second key group 1053 comprises a plurality of keys 1050. Once a key 1050 of the second key group 1053 is pressed, the remote controller 105 will emit the remote control signals 105a corresponding to the key 1050. The key 1050 of the second key group 1053 is adapted to operate the smartphone 20. A frame whereby the smartphone 20 executes the remote control signals 105a is displayed on a frame 103b shown in FIG. 6.

The keys 1050 of the first and second key groups 1051, 1053 are physical keys or on-screen virtual keys.

According to the present invention, a frame of the smartphone 20 is sent to the LCD television set 10 and displayed on the display 103. A video output and even an audio output of the smartphone 20 are implemented by a conventional wired HDMI output means. The smartphone 20 can be connected to the LCD television set 10 by an HDMI cable. If both the smartphone 20 and the LCD television set 10 have therein a built-in wireless HDMI transmitting/receiving means, such as WiHD, WiDi (Wireless Display), a video output and even an audio output of the smartphone 20 can be implemented by a conventional wireless HDMI transmission means for transmitting a video and an audio, and then the LCD television set 10 receives the video and the audio by a corresponding conventional wireless HDMI receiving means.

Figure 5:
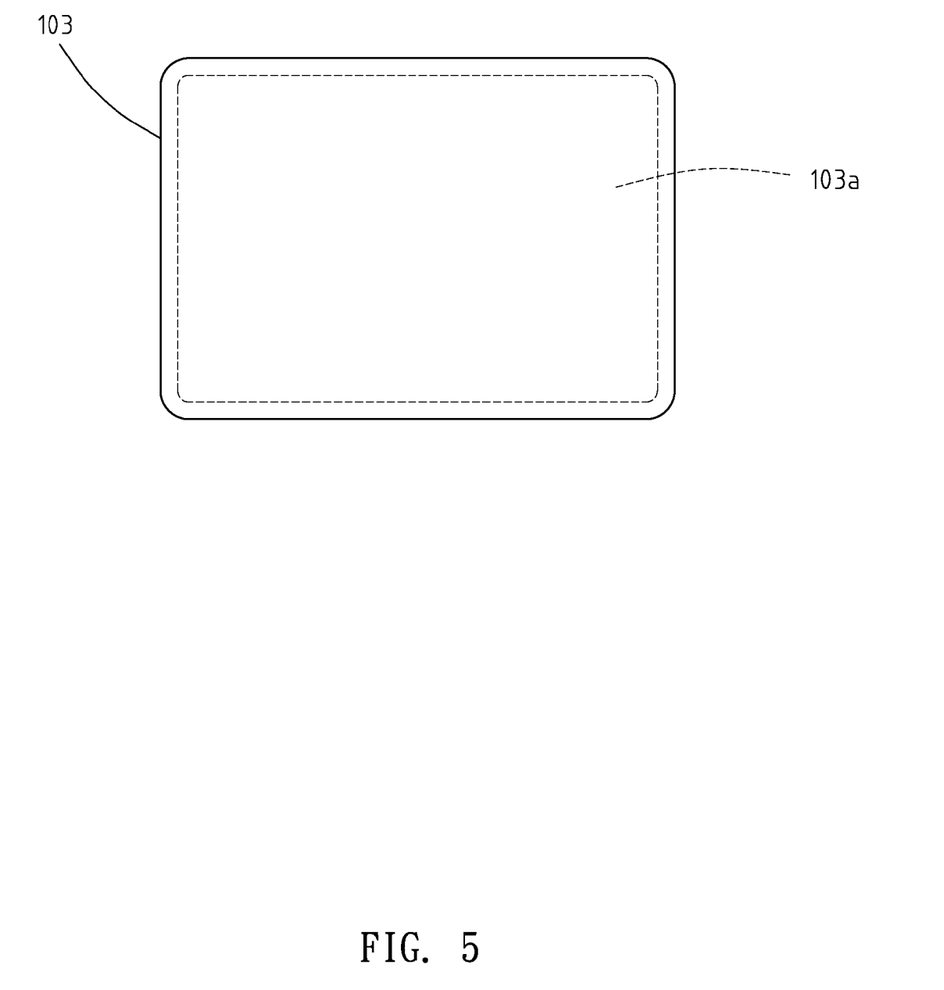
FIG. 5 is a schematic view of a frame displayed on the display of the LCD television set in response to a television video signal according to the present invention.
Figure 6:
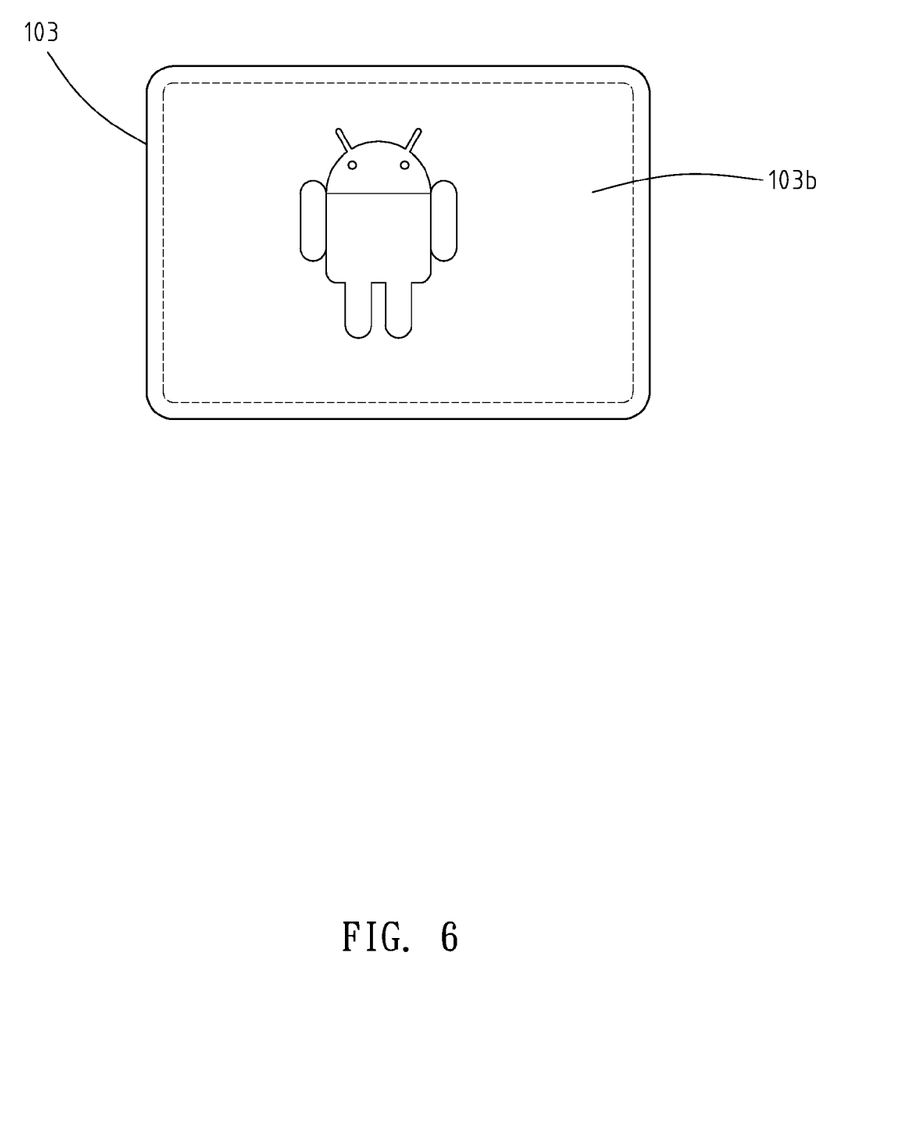
FIG. 6 is a schematic view of a frame generated from a smartphone and displayed on the display of the LCD television set according to the present invention.

The flat screen television processor 101 switches between the frame 103a and the frame 103b docking based on the remote control signals 105a of the first key group 1051 and the second key group 1053.

The cursor coordinate input device 1055 is located at a region in the vicinity of the bottom of the remote controller 105. The primary purpose of the cursor coordinate input device 1055 is to provide a cursor coordinate signal to the smartphone 20. For example, the cursor coordinate input device 1055 is a conventional touch panel applicable to a notebook computer. The cursor coordinate signal generated from the cursor coordinate input device 1055 is received and processed by the flat screen television processor 101. Afterward, the flat screen television processor 101 informs the application processor 201 of a signal corresponding to the cursor coordinate signal via the first connector 107 in the first specific embodiment or the bus interface 111 in the second specific embodiment.

The microphone 1057, the speaker 1058, and the wireless voice receiving and transmitting circuit 1059 are accessible to applications (App) of the smartphone 20, such as an application (App) for making a call, an application (App) for answering a call, or an application (App) for a webcam chat. A user with the microphone 1057 and the speaker 1058 can have a voice conversation with another user with the smartphone 20, wherein the latter user is answering the call, making the call, or having the webcam chat. The microphone 1057 and the speaker 1058 are connected to the wireless voice receiving and transmitting circuit 1059. The microphone 1057, the speaker 1058, and the wireless voice receiving and transmitting circuit 1059 employ conventional components and apply circuit-related prior art.

The user may choose to use a microphone and a speaker which are built in the smartphone 20 and thereby dispense with the microphone 1057, the speaker 1058, and the wireless voice receiving and transmitting circuit 1059. In doing so, the user can use the hands-free function of the smartphone 20 while having a voice conversation with another user with the smartphone 20, wherein the latter user is answering the call, making the call, or having the webcam chat.

The LCD television set 10 of the present invention has the ability to incorporate with the application processor 201 of the smartphone 20, enables users of the LCD television set 10 to control the smartphone 20 directly with the remote controller 105, enables the LCD television set 10 to start to function as a smart LCD television set as soon as an application (App) is executed by the smartphone 20, and allows the LCD television set 10 functioning as a smart LCD television set to be operated by the user using the same remote controller 105. The present invention improves on conventional LCD television sets and conventional smartphones greatly and involves an inventive step notably.

Hence, the present invention meets the three requirements of patentability, namely novelty, non-obviousness, and industrial applicability.

The present invention is disclosed above by preferred embodiments. However, persons skilled in the art should understand that the preferred embodiments are illustrative of the present invention only, but should not be interpreted as restrictive of the scope of the present invention. Hence, all equivalent changes or modifications made to the aforesaid embodiments should fall within the scope of the present invention, provided that they do not depart from the spirit embodied in the present invention.

What is claimed is:

1. A LCD television set capable of external connection with application processor, comprising:
   a remote controller comprising a first key group having a plurality of keys and a second key group having a plurality of keys, wherein the first key group is for use in operating the LCD television set, and the second key group is for use in operating a smartphone, wherein a portion of the keys of the second key group is associated with a plurality of applications (App) of the smartphone;
   a flat screen television processor for processing an incoming television video signal, displaying a frame corresponding to the television video signal on a display, and receiving and processing a plurality of remote control signals corresponding to the first and second key groups;
   a docking base being for docking the smartphone and equipped with a first connector;
   the first connector electrically connected to the flat screen television processor and in contact with a second connector disposed at the smartphone, such that the flat screen television processor and an application processor of the smartphone are electrically connected;
   the flat screen television processor outputs a plurality of signals to the smartphone via the first and second connectors based on the remote control signals of the second key group, and a portion of the signals which being associated with the portion of keys of the second key group trigger the application processor of the smartphone to execute the applications (App) corresponding thereto;
   the application processor of the smartphone further outputs a plurality of signals via the second and first connectors; and
   the keys of the first and second key groups are physical keys or on-screen virtual keys.

2. The LCD television set capable of external connection with application processor of claim 1, wherein the remote controller further comprises a microphone, a speaker, and a wireless voice receiving and transmitting circuit connected to the microphone and the speaker.

3. The LCD television set capable of external connection with application processor of claim 1, wherein the second key group further provides cursor coordinate signals to the smartphone.

4. The LCD television set capable of external connection with application processor of claim 1, wherein the remote controller further comprises a cursor coordinate input device for providing cursor coordinate signals to the smartphone.

5. A LCD television set capable of external connection with application processor, comprising:
   a remote controller comprising a first key group having a plurality of keys and a second key group having a plurality of keys, wherein the first key group is for use in operating the LCD television set, and the second key group is for use in operating a smartphone, wherein a portion of the keys of the second key group is associated with a plurality of applications (App) of the smartphone;
   a flat screen television processor for processing an incoming television video signal, displaying a frame corresponding to the television video signal on a display, and receiving and processing a plurality of remote control signals corresponding to the first and second key groups; and
   a docking base being for docking the smartphone and equipped with an interface connector for use with a bus interface;
   the bus interface for use with the application processor electrically connected to the flat screen television processor and the smartphone;
   the flat screen television processor outputs a plurality of signals to the smartphone via the bus interface based on the remote control signals of the second key group, and a portion of the signals which being associated with the portion of the keys of the second key group trigger the application processor of the smartphone to execute the (App) corresponding thereto; and
   the keys of the first and second key groups are physical keys or on-screen virtual keys.

6. The LCD television set capable of external connection with application processor of claim 5, wherein the application processor of the smartphone further outputs a plurality of signals via the second and first connectors.

7. The LCD television set capable of external connection with application processor of claim 5, wherein the bus interface transmits a data bus signal, an address bus signal, and a control bus signal.

8. The LCD television set capable of external connection with application processor of claim 5, wherein the application processor of the smartphone further outputs a plurality of signals via the bus interface.

9. The LCD television set capable of external connection with application processor of claim 5, wherein the second key group further provides cursor coordinate signals to the smartphone.

10. The LCD television set capable of external connection with application processor of claim 5, wherein the remote controller further comprises a cursor coordinate input device for providing cursor coordinate signals to the smartphone.

11. The LCD television set capable of external connection with application processor of claim 5, further comprising a semiconductor memory connected to the bus interface.

\* \* \* \* \*